(12) United States Patent
Vissiere et al.

(10) Patent No.: US 11,898,872 B2
(45) Date of Patent: *Feb. 13, 2024

(54) METHOD FOR CALIBRATING A GYROMETER EQUIPPING A VEHICLE

(71) Applicant: SYSNAV, Vernon (FR)

(72) Inventors: David Vissiere, Paris (FR); Mathieu Hillion, Vernon (FR); Hendrik Meier, Vernon (FR); Jean-Philippe Dugard, Vernon (FR)

(73) Assignee: SYSNAV, Vernon (FR)

( * ) Notice: Subject to any disclaimer, the term of this patent is extended or adjusted under 35 U.S.C. 154(b) by 583 days.

This patent is subject to a terminal disclaimer.

(21) Appl. No.: 16/977,785

(22) PCT Filed: Mar. 15, 2019

(86) PCT No.: PCT/FR2019/050588
§ 371 (c)(1),
(2) Date: Sep. 2, 2020

(87) PCT Pub. No.: WO2019/175516
PCT Pub. Date: Sep. 19, 2019

(65) Prior Publication Data
US 2021/0088357 A1     Mar. 25, 2021

(30) Foreign Application Priority Data

Mar. 15, 2018  (FR) ...................... 1852230

(51) Int. Cl.
*G01C 25/00* (2006.01)
*G01C 19/00* (2013.01)
*G01C 22/02* (2006.01)
(52) U.S. Cl.
CPC ........... *G01C 25/005* (2013.01); *G01C 19/00* (2013.01); *G01C 22/025* (2013.01)

(58) Field of Classification Search
CPC .... G01C 25/005; G01C 19/00; G01C 22/025; G01C 21/165
See application file for complete search history.

(56) References Cited

U.S. PATENT DOCUMENTS

| 4,788,645 A | 11/1988 | Zavoli et al. |
| 5,416,712 A * | 5/1995 | Geier ................... G01C 21/165 |
| | | 701/472 |

(Continued)

FOREIGN PATENT DOCUMENTS

| EP | 1094299 A2 | 4/2001 |
| FR | 2939514 A1 | 6/2010 |

(Continued)

OTHER PUBLICATIONS

International Preliminary Report on Patentability received for PCT Patent Application No. PCT/FR2019/050588, dated Sep. 24, 2020, 25 pages (12 pages of English Translation and 13 pages of Original Document).

(Continued)

*Primary Examiner* — Natalie Huls
*Assistant Examiner* — Cynthia L Davis
(74) *Attorney, Agent, or Firm* — WOMBLE BOND DICKINSON (US) LLP (57) ABSTRACT

The present invention relates to a method for calibrating a gyrometer equipping a vehicle. The method includes a step (a) of acquisition, by the gyrometer, of a measured angular velocity of the vehicle, and, by measuring measured values of at least one quantity representative of the angular velocity of the vehicle. It also includes a step (b) of determination, by a data processor, of values of at least one gyrometer calibration parameter minimising a difference between a first estimated angular velocity of the vehicle and a second estimated angular velocity of the vehicle, wherein the first estimated angular velocity is a function of the measured (Continued)

angular velocity and parameters for calibrating the gyrometer, and the second estimated angular velocity is a function of the measured values of said at least one quantity representative of the angular velocity of the vehicle.

17 Claims, 2 Drawing Sheets

(56) References Cited

U.S. PATENT DOCUMENTS

| | | | |
|---|---|---|---|
| 8,965,691 B1 | 2/2015 | Lombrozo | |
| 2008/0078246 A1* | 4/2008 | Li | G01C 19/5719 73/504.02 |
| 2009/0005985 A1* | 1/2009 | Basnayake | G01C 25/00 701/501 |
| 2009/0265054 A1 | 10/2009 | Basnayake | |
| 2010/0259318 A1* | 10/2010 | Bien | G01C 19/5776 327/551 |
| 2012/0022780 A1 | 1/2012 | Kulik et al. | |
| 2012/0186345 A1* | 7/2012 | Bauer | G01C 25/00 73/504.12 |
| 2013/0047726 A1* | 2/2013 | Lin | G01C 19/5712 73/504.12 |
| 2013/0110391 A1 | 5/2013 | Obi | |
| 2013/0297204 A1* | 11/2013 | Bartels | G01C 25/005 701/495 |

FOREIGN PATENT DOCUMENTS

| | | |
|---|---|---|
| JP | 11-023606 A | 1/1999 |
| JP | 2006-199242 A | 8/2006 |

OTHER PUBLICATIONS

International Search Report and Written Opinion received for PCT Patent Application No. PCT/FR2019/050588, dated Aug. 5, 2019, 30 pages (14 pages of English Translation and 16 pages of Original Document).

Minitab Blog Editor, "How to Interpret a Regression Model with Low R-squared and Low P values", Available Online at <https://blog.minitab.com/blog/adventures-in-statistics-2/how-to-interpret-a-regression-model-with-low-r-squared-and-low-p-values>, Jun. 12, 2014, pp. 1-6.

Preliminary Research Report received for French Application No. 1852230, dated Oct. 31, 2018, 8 pages (1 page of French Translation Cover Sheet and 7 pages of original document).

Wikipedia, "Calibration", Available Online at <https://en.wikipedia.org/w/index.php?title=Calibration&oldid=824261899>, Feb. 6, 2018, pp. 1-11.

\* cited by examiner

METHOD FOR CALIBRATING A GYROMETER EQUIPPING A VEHICLE

GENERAL TECHNICAL FIELD

The present invention relates to the field of navigation without GNSS.

More specifically, it relates to a method for calibrating a gyrometer equipping a vehicle provided with odometers.

PRIOR ART

It is today common to track the position of a vehicle by GNSS (Global Navigation Satellite System, for example GPS) or by using a communication network (triangulation using transmitter terminals, Wi-Fi network or others).

These methods prove to be very limited because they do not work indoors, in tunnels, or too far from the emitters, and prove to be dependent on external technologies such as satellites for GNSS which may be unavailable or even voluntarily scrambled.

Alternatively, "autonomous" methods are also known for tracing in any environment the relative displacement of a vehicle using an inertial or magneto-inertial unit. Relative displacement is taken to mean the trajectory of the vehicle in space with respect to a point and to a fix given at initialisation. In addition to the trajectory, these methods also make it possible to obtain the orientation of the vehicle with respect to the same initial fix.

An inertial unit is constituted at least of three accelerometers and three gyrometers arranged triaxially. Typically, the gyrometers "maintain" a fix, in which a double temporal integration of the measurements of the accelerometers make it possible to estimate the movement.

It is notably known that to be able to use conventional inertial navigation methods, such as implemented in heavy duty applications such as navigation of fighter planes or passenger planes, submarines, ships, etc., it is necessary to use very high precision sensors. Indeed, the single double temporal integration of an acceleration measurement means that a constant acceleration error creates a positional error which increases in a manner proportional to the square of time.

Odometry is an alternative technique making it possible to estimate the position of a moving wheeled vehicle from the individual measurement of the displacements of its wheels.

Figure 1:
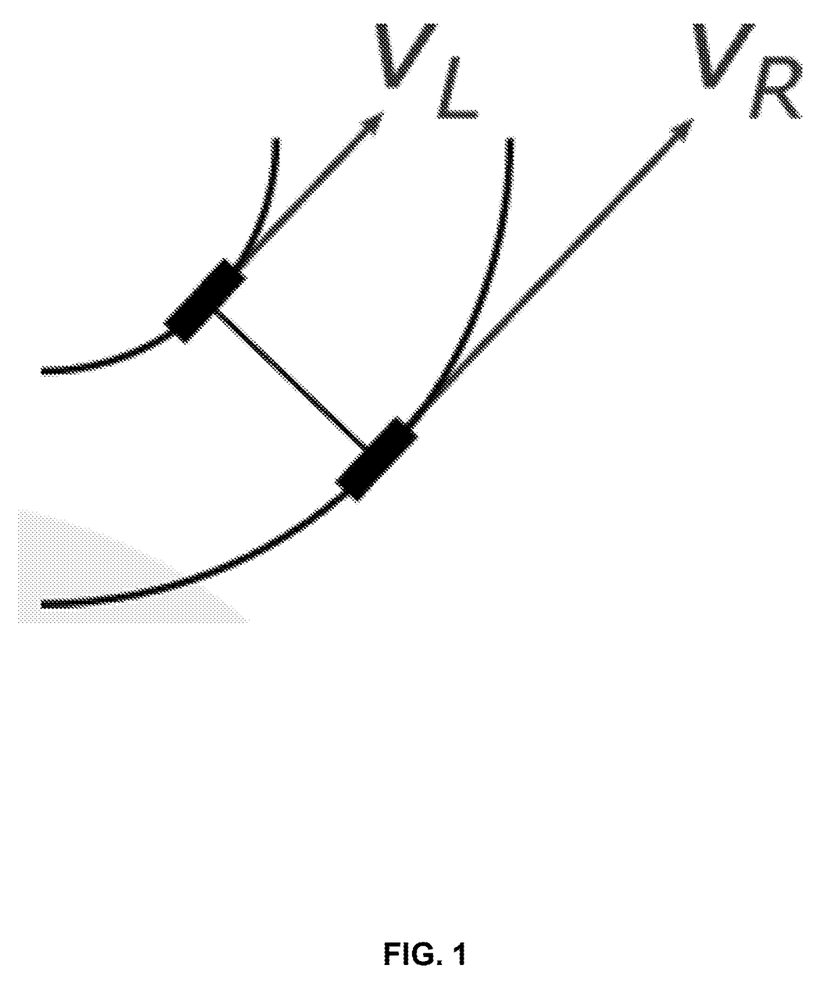
FIG. 1 is a diagram illustrating differential odometry.

Conventionally, with reference to FIG. 1, odometers are used to measure the curvilinear abscissa and the frequency of rotation of two wheels (for example the left and right rear wheels), the corresponding respective velocities $v_L$ and $v_R$ are deduced therefrom (as a function of the diameter of the wheels), and by "differential odometry" the "overall" velocity $v$ is obtained (i.e. the velocity of the centre of the axle connecting the two wheels $10a$, $10b$) and the angular velocity $\omega$ of the vehicle via the equations:

$$\begin{cases} v = \dfrac{v_L + v_R}{2} \\ \omega = \dfrac{v_R - v_L}{d}, \end{cases}$$

with d the distance between the wheels.

Differential odometry provides satisfaction, the U.S. Pat. No. 8,965,691 proposes for example a generalised version on n wheels used to track the movement of a vehicle as an alternative to GNSS or to an inertial unit during small displacements at low velocity (which are not properly detectable by GNSS), for example during manoeuvres while parking.

However, differential odometry proves to be very liable to introduce errors and cannot be used alone as a total replacement for GNSS.

Indeed, in order for it to be reliable, it is necessary that there is not the least skidding, that the two wheels considered are perfectly parallel, and that parameters such as the distance between the wheels or their diameter are constant and known with precision. Furthermore, at low velocity, the velocity result of an odometer counting "tops" (see below) loses precision which degrades all the more the angular velocity result derived from differential odometry.

And, furthermore, differential odometry gives the angular velocity around the vertical axis with respect to the vehicle instead of the road. This alone only enables the calculation of the bearing providing that the road is horizontal.

Consequently, it has been proposed to use in combination with odometers a gyrometer, or even a complete inertial unit.

A first approach is to use the gyrometer/inertial unit (or another reference) to calibrate the odometers. In this respect, the patent application US2012/0022780 is notably known, which discusses the defects of odometry with an error model.

This method proves to be cumbersome and only partially resolves the problem.

Alternatively, US2009/0265054 proposes using a gyrometer to determine the bearing, and differential odometry (as well as other signals such as the angle of the steering wheel) to identify a trajectory along a straight line in order to de-bias the gyrometer. In terms of the equations given above, this method corresponds to seeing if $v_R = v_L$ (or, in practice if their difference is below a given threshold). For the case of $v_R \neq v_L$ in a situation of non-zero angular velocity (or exceeding the threshold given to identify a trajectory along a straight line), the method of US2009/0265054 does not provide any quantitative processing nor use of odometric velocity.

Such a method is simple and efficient, but proves to be restrictive, since it is dependent on straight lines. Furthermore, it is not in practice sufficient that the trajectory is in a straight line, it is also necessary that it is not accelerated too strongly, and the straight line without acceleration only makes it possible to identify the bias of the gyrometer, and not the scale factor.

It would be desirable to have available a novel method for calibrating a gyrometer of a vehicle with a view to the estimation of the movement of the vehicle which enables an excellent quality of result and is not restrictive.

DESCRIPTION OF THE INVENTION

The present invention thus pertains, according to a first aspect, to a method for calibrating a gyrometer equipping a vehicle, the method being characterised in that it comprises the steps of:
(a) Acquisition
  by the gyrometer, of a measured angular velocity of the vehicle, and
  by means for measuring at least one quantity representative of the angular velocity of the vehicle, of measured values of said at least one quantity representative of the angular velocity of the vehicle;
(b) Determination by data processing means of values of at least one parameter for calibrating the gyrometer minimising a difference between a first estimated angular velocity of the vehicle and a second estimated angular velocity of the vehicle, the first estimated angular velocity of the vehicle being a function of the measured angular velocity and parameters for calibrating the gyrometer, and the second estimated angular velocity of the vehicle being a function of the measured values of said at least one quantity representative of the angular velocity of the vehicle.

According to other advantageous and non-limiting characteristics:

the first estimated angular velocity $\omega_{gyro}^{(estimation)}$ of the vehicle is linked to the angular velocity $\omega_{gyro}^{(measured)}$ measured by a model $\omega_{gyro}^{(estimation)} = D \cdot (\omega_{gyro}^{(measured)} + b)$, where D and b are the parameters for calibrating the step (b) comprises the implementation of a recursive filter or an optimisation;

the measurement means consist either in at least two odometers (20a, 20b), or a steering wheel angle sensor;

the measurement means consist in at least two odometers, the vehicle having at least two wheels provided with odometers, said quantities representative of the angular velocity of the vehicle being the velocities of said wheels, and said second estimated angular velocity of the vehicle being a function of the measured velocities of the wheels and parameters for calibrating the odometers;

step (b) also comprises the determination of values of at least one parameter for calibrating the odometers;

the two rear wheels of the vehicle are provided with odometers, the second estimated angular velocity $\omega_{odo}^{(estimation)}$ of the vehicle being linked to the measured velocities $v_L$, $v_R$ respectively for the left rear wheel and the right rear wheel by the formula $$\omega_{odo}^{(estimation)} = \frac{\alpha_R v_R - \alpha_L v_L}{d},$$

where $\alpha_R$, $\alpha_L$, and d are the parameters for calibrating the odometers;

the calibration parameters D and d are predetermined, step (b) comprising the determination of the calibration parameters b, $\alpha_R$ and $\alpha_L$;

step (b) comprises the minimisation of $|\omega_{odo}^{(estimation)} - \omega_{gyro}^{(estimation)}|$;

the method comprises a step (c) of estimating a parameter representative of an error on the calibration parameters;

said parameter representative of an error on the calibration parameters is a function of said first and second estimated angular velocities calculated for the determined values of the calibration parameters;

said parameter representative of an error on the calibration parameters is the average of $|\omega_{odo}^{(estimation)} - \omega_{gyro}^{(estimation)}|^2$ over a given time interval;

step (c) comprises, if said parameter representative of an error on the calibration parameters is below a predetermined threshold, the actual calibration of the gyrometer and if appropriate means for measuring at least one quantity representative of the angular velocity of the vehicle, as a function of the determined values of the calibration parameters;

the method comprises a step (d) of estimation by the data processing means of the movement of said vehicle as a function of the measured angular velocity of the vehicle and/or the measured velocities of said wheels, and the values of the calibration parameters, wherein an orientation of the vehicle is estimated at step (d) uniquely as a function of the measured angular velocity of the vehicle and the values of the calibration parameters, and the measured velocities of said wheels are used to estimate an overall velocity of the vehicle.

According to a second aspect, a wheeled vehicle, comprising a gyrometer configured to acquire a measured angular velocity of the vehicle, means for measuring at least one quantity representative of the angular velocity of the vehicle and configured to acquire measured values of said at least one quantity representative of the angular velocity of the vehicle is proposed, the vehicle being characterised in that it further comprises data processing means configured to determine the values of at least one parameter for calibrating the gyrometer minimising a difference between a first estimated angular velocity of the vehicle and a second estimated angular velocity of the vehicle, the first estimated angular velocity of the vehicle being a function of the measured angular velocity and parameters for calibrating the gyrometer, and the second estimated angular velocity of the vehicle being a function of the measured values of said at least one quantity representative of the angular velocity of the vehicle.

According to a third and a fourth aspect, a computer programme product comprising code instructions for the execution of a method according to the first aspect of the invention for calibrating a gyrometer; and a storage means readable by a computer equipment on which a computer programme product comprises code instructions for the execution of a method according to the first aspect of calibration of a gyrometer are proposed.

PRESENTATION OF THE FIGURES

Other characteristics and advantages of the present invention will become clear on reading the description of a preferential embodiment that follows. This description will be given with reference to the appended drawings in which.

DETAILED DESCRIPTION

Architecture

Figure 2:
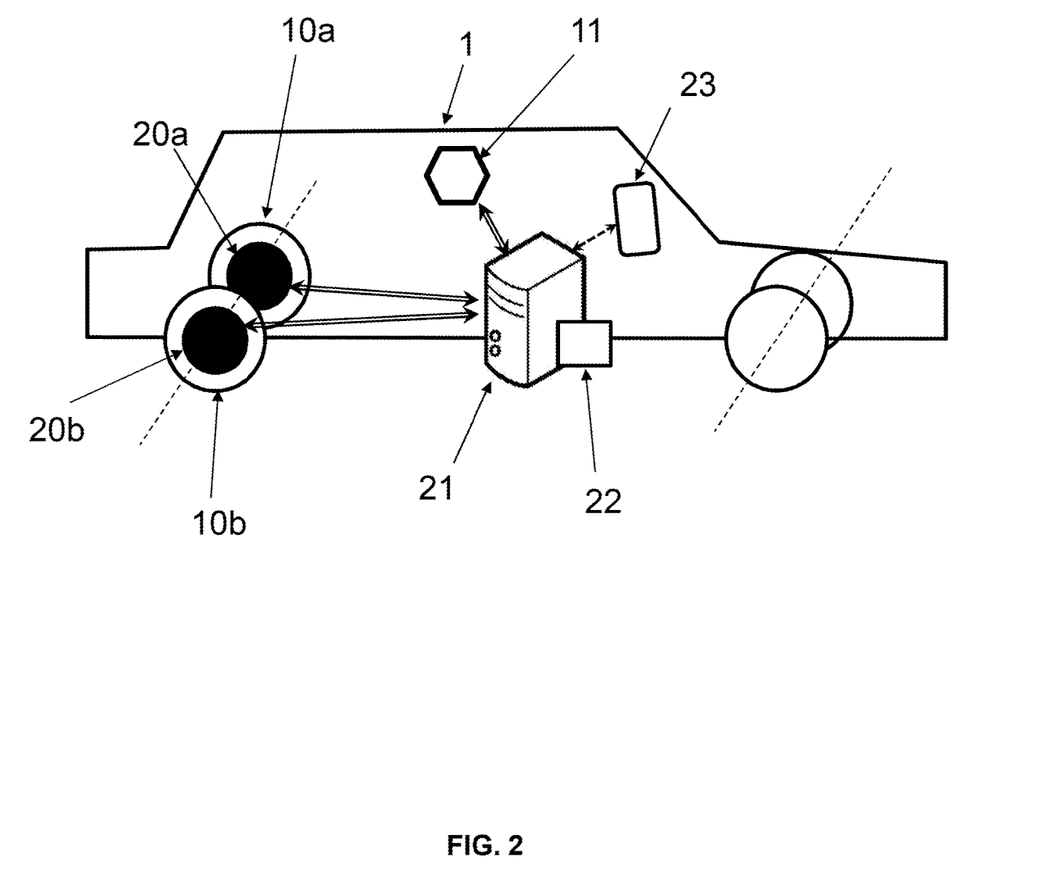
FIG. 2 represents an exemplary vehicle architecture for the implementation of the method according to the invention.

With reference to FIG. 2, the present method enables the calibration of a gyrometer 11 (i.e. inertial measurement means capable of measuring an angular velocity of the vehicle 1) equipping a vehicle 1. The vehicle is further equipped with means for measuring 20 at least one other quantity representative of the angular velocity of the vehicle 1.

It is understood that the means 20 may be any sensor integral with the vehicle 1 other than a gyrometer making it possible to obtain indirectly an angular velocity. Said measurement means 20 thus consist advantageously in an angular steering wheel sensor (said at least one quantity representative of an angular velocity of the vehicle 1 is the angle of the steering wheel with respect to a reference position wherein the vehicle 1 runs in a straight line), and/or in at least two odometers 20a, 20b, i.e. the vehicle 1 has at least two wheels 10a, 10b each provided with an odometer 20a, 20b (the quantities representative of an angular velocity of the vehicle 1 are the velocities of each of the wheels 10a, 10b provided with an odometer 20a, 20b). More specifically, in this preferred so-called "odometric" embodiment which will be described in particular in the remainder of the present description, the vehicle 1 comprises a gyrometer 11 and at least two odometers 20a, 20b each for one wheel 10a, 10b of the vehicle 1. Naturally, wheels of the vehicle 1 may not be equipped with odometers 20a, 20b.

In the example of FIG. 2, which represents a conventional vehicle 1 with four wheels of car type, the two rear wheels 10a, 10b of the vehicle 1 are provided with odometers 20a, 20b (respectively for the left rear wheel 10a, and the right rear wheel) and the two front wheels are not provided therewith. It is an advantageous configuration because the rear wheels do not turn around a vertical axis like the front wheels, i.e. remain perfectly parallel and at a constant distance. Furthermore, in the most common case of a front wheel drive vehicle, the rear wheels are not driven, and thus skid less.

However it will be understood that alternatively the two front wheels may be taken (this example will also be described, as will be seen the front wheels are no longer exactly parallel with each other when the steering wheel is turned, but it is possible to calculate the impact thereof), or a front wheel and a rear wheel, or even three or four wheels. Generally speaking, those skilled in the art will know how to use Ackermann steering geometry for this purpose.

It should be noted that the vehicle 1 is not necessarily a car and may be any vehicle with any number of wheels (including more than four, as in a lorry).

Odometer is taken to mean equipment capable of measuring the velocity of a wheel by counting the revolutions ("rev counter") or by measuring the curvilinear abscissa. Generally, odometers have a part fixed to the wheel (for example a magnet), and detect each passage of this fixed part (called "top") so as to count the number of revolutions per time unit, which is the frequency of rotation. Other techniques are known, for example the optical detection of a mark on the wheel, or the magnetometer of the patent FR2939514 which detects the rotation of an object comprising metal elements.

Here the "velocity" of a wheel is a scalar, i.e. the norm of the velocity of the wheel in the terrestrial reference frame (in the hypothesis of absence of skidding). If the radius r of the wheel 10a, 10b is known, the measurement of the frequency f of rotation makes it possible to estimate this norm of the velocity: $v=2\pi rf$.

In the present method, it will be understood that either the odometers 20a, 20b are directly capable of providing the velocities of the wheels 10a, 10b, or they just indicate the "tops" and it is a processing unit 21 that will be described hereafter that deduces the velocities therefrom.

The vehicle 1 is further equipped with the gyrometer 11 (typically integral with the bodywork, and generally speaking fixed in the frame of reference of the vehicle 1), i.e. inertial measurement means capable of measuring the angular velocity of the vehicle 1 according to a three orthogonal axes system, which defines the vehicle frame of reference.

The rotation around a vertical axis is described by the angle on which the driver acts while turning the steering wheel. On generally flat ground, changes in direction of the vehicle are in the horizontal plane, i.e. also along said vertical axis.

In reality, non-zero values for rolling (rotation along the longitudinal axis of the vehicle 1) and pitching (rotation along the transversal axis of the vehicle 1) may be the result for example of a sloping road. The processing of these angles may become important at the moment of the estimation of the movement; conversely, the rotation around the vertical axis of the vehicle is exactly what differential odometry provides as measurement ideally.

Thus, it will be noted in all cases that the estimation of the bias of the gyrometer 11 along the vertical axis of the vehicle 1 is mainly exact (even for a road which is not horizontal).

It is observed that the movement of the chassis on which the gyrometer 11 is fixed may disturb this axis with respect to the axis normal to the plane of the road in the case of longitudinal or transversal acceleration. This effect may be negligible or modellable for sufficiently small accelerations, which may be verified a posteriori, for example, by characterising the calibration (see below).

For convenience, $\omega$ will note the vertical component of the angular velocity vector $\vec{\omega}$. By convention, the angular velocity is positive for a bend in the anti-clockwise direction ("turn right") and negative in the clockwise direction ("turn left").

It should be noted that the vehicle 1 may be equipped with other gyrometers along other axes and/or accelerometers, or even comprise an inertial unit with at least three accelerometers and three gyrometers arranged triaxially. The accelerometers are sensitive to external forces other than gravitational applied on the sensor, and make it possible to measure a specific acceleration noted $\vec{\gamma}$.

The vehicle 1 further comprises as explained processing means 21 (typically a processor) for the implementation directly in real time of the processing operations of the present method, for example an on-board computer of the vehicle 1, and optionally a memory 22, and an interface 23 to feedback information on the movement of the vehicle 1 to the driver (an instantaneous velocity value, a bearing, a position on a map, etc.), and/or to send commands to the vehicle 1. The vehicle 1 may in this respect notably be an autonomous vehicle, and the processing means 21 configured to implement the autonomous navigation of the vehicle 1. Thus, said commands are sent to the control members of the vehicle (engine, steering wheel actuators, etc.) so as to simulate driving by the driver.

The gyrometer 11 and the measurement means 20 (preferentially the odometers 20a, 20b) are connected to the data processing means 21 in particular in a wired manner, for example via Ethernet.

The vehicle 1 may optionally comprise complementary sensors such as a GNSS receiver, etc.

Method

The present method is a method for calibrating at least the gyrometer 11. Calibration is taken to mean the determination of one or more calibration parameters, of which a list will be seen hereafter. In particular, certain calibration parameters may be considered reliable, and predetermined. As regards those to determine, it is possible to provide that they have "current" values, and that these values are going if appropriate to be modified.

In a particularly preferred embodiment, the method may further be a method for calibrating measurement means 20 (the odometers 20a, 20b), i.e. the gyrometer 11 and the odometers 20a, 20b may be calibrated simultaneously. This is an extremely advantageous embodiment, since as will be seen there is even no longer need to assume that the measurement of the means 20 (odometry) is correctly calibrated to use it as reference to calibrate the gyrometry: the two automatically calibrate each other. Alternatively, it will obviously be possible to consider the measurement means 20 (the odometers 20a, 20b) as correctly calibrated and to calibrate the gyrometer 11 as a consequence, which makes it possible for example to calibrate more parameters of the gyrometer 11.

As will be seen hereafter, in an advantageous embodiment the present method is even a method for estimating the movement of the vehicle 1, i.e. it comprises following calibration the use of measurements to deduce therefrom in a reliable manner one or more components of the movement.

The present method functions in the case of straight trajectory without strong acceleration (proposed in the document US 2009/0265054), but also in the case of trajectories with varied bends and accelerations.

In a first step (a), the method comprises the acquisition by the gyrometer 11 of a measured angular velocity of the vehicle 1, noted $\omega_{gyro}^{(measured)}$, and by the means for measuring 20 so-called measured values of the at least one quantity representative of the angular velocity of the vehicle 1. In the odometric embodiment, step (a) more specifically comprises the acquisition by the odometers 20a, 20b, of measured velocities of said wheels 10a, 10b. In the preferred example of a left wheel 10a and a right wheel 10b, these velocities are noted $v_L$ and $v_R$.

These quantities are advantageously measured with a dt sampling (i.e. every "dt" seconds) with dt very small compared to the characteristic time of the movements of the vehicle 1, typically 40 ms.

Here, "angular velocity of the vehicle 1" is taken to mean as explained at least that around its vertical axis, but those along other axes could also be considered.

In a step (b), the data processing means 21 determine the values of at least one parameter for calibrating the gyrometer 11 minimising a difference between a first estimated angular velocity of the vehicle 1 and a second estimated angular velocity of the vehicle 1.

The idea is to estimate in different ways, in particular by using different data, the angular velocity. Ideally, the two estimations coincide, if not it means that the sensors have to be recalibrated.

Generally speaking, step (b) is implemented in a recurrent manner to regularly recalibrate the gyrometer 11.

The first estimated angular velocity of the vehicle 1, noted $\omega_{gyro}^{(estimation)}$, is derived from gyrometry. It is a function of the measured angular velocity and parameters for calibrating the gyrometer 11. Preferably, it is linked to the measured angular velocity $\omega_{gyro}^{(estimation)}$ by the formula $\omega_{gyro}^{(estimation)} = D \cdot (\omega_{gyro}^{(measured)} + b)$, where D and b are the parameters for calibrating the gyrometer 11. More specifically, D is a scale factor and b a bias. Those skilled in the art will know furthermore how to correct, if needs be for the desired precision, the impact of terrestrial rotation on $\omega_{gyro}^{(measured)}$, which depends on the latitude.

In the case of a three-dimensional attitude, D is a general 3×3 matrix=(orthogonal matrix of passage to the correct fix)×(upper triangular matrix containing the scale factors and the adjustments). In so far as ω only describes at present the rotation around the vertical axis of the vehicle 1, it is sufficient to only formulate the equations explicitly for this case. Preferably, it is considered that D is predetermined (it varies in practice very slightly) and that the only calibration parameter to determine for the gyrometer 11 is b, which has effectively a tendency to vary over time (known as drift of the gyrometer 11).

It should be noted that, more generally, it is possible to consider a general error model: $\omega_{gyro}^{(estimation)} = g(\omega_{gyro}^{(measured)})$ with g a function (application) which is not necessarily refined.

The second estimated angular velocity of the vehicle 1, noted $\omega_{odo}^{(estimation)}$ is derived from the other type of measurement, in particular odometry. In the odometric embodiment, it is a function of the measured velocities of the wheels 10a, 10b and parameters for calibrating the odometers 20a, 20b and, possibly, geometric parameters of the vehicle which do not form part of the calibration parameters. The parameters for calibrating the odometers are physical parameters of the vehicle 1. As explained, in the preferred embodiment where the rear wheels of the vehicle 1 are considered, the second estimated angular velocity $\omega_{odo}^{(estimation)}$ of the vehicle 1 is linked to the measured velocities $v_L$, $v_R$ respectively for the left rear wheel 10a and the right rear wheel 10b by a formula of the type $$\omega_{odo}^{(estimation)} = \frac{v_R - v_L}{d},$$

with d the distance between the wheels 10a, 10b. If for example the two front wheels are taken, it is possible to use a system of equations linking $\omega_{odo}^{(estimation)}$ and v (the norm of the velocity of the vehicle 1) of the type $$\begin{cases} v_R^2 = \left(v + \frac{d}{2} \cdot \omega_{odo}^{(estimation)}\right)^2 + (a \cdot \omega_{odo}^{(estimation)})^2 \\ v_L^2 = \left(v - \frac{d}{2} \cdot \omega_{odo}^{(estimation)}\right)^2 + (a \cdot \omega_{odo}^{(estimation)})^2 \end{cases},$$

with a the distance between the front axle and the rear axle of the vehicle, according to Ackermann steering geometry. Preferably, in the remainder of the present description the case of odometers 20a, 20b on the rear wheels, which is the simplest, will continue to be considered.

It should be noted that there may be additional odometers of which the measurements are not taken into account at this stage. For example three wheels may be provided with odometers, and the measurement of only two used in step (b), the measurements of the odometer of the third wheel being able to be used separately, see hereafter.

To take into account the defects of this model, it is possible to add calibration parameters characterising the "actual" radii of the wheels 10a, 10b (which vary as a function of temperature, age, pressure, etc.), by weighting it with coefficients of the order of 1, i.e. in the formula $v_R$ is replaced by $\alpha_R v_R$ and $v_L$ by $\alpha_L v_L$. If more than two wheels are used, as many coefficients α are added.

The formula of the second estimated angular velocity (in the case of the rear wheels) then becomes:

$$\omega_{odo}^{(estimation)} = \frac{\alpha_R v_R - \alpha_L v_L}{d},$$

where $\alpha_R$, $\alpha_L$ and d are the parameters for calibrating the gyrometer 11. Once again, it may be assumed that the distance d is predetermined (it varies in practice very slightly) and that the only calibration parameters to determine for the odometers are $\alpha_R$ and $\alpha_L$.

Thus, in the particularly preferred embodiment of simultaneous double calibration, there are only three calibration parameters to determine: $\alpha_R$, $\alpha_L$ and b. This restricted number of parameters enables such a double calibration from the moment that the vehicle 1 has a "varied" trajectory (directions/velocities which vary as a function of time). This is useful in particular to the case of deformations and defects of tyres as a function of high velocities and/or accelerations, cf. U.S. Pat. No. 4,788,645.

Advantageously, the object minimised in step (b) is the difference $|\omega_{odo}^{(estimation)} - \omega_{gyro}^{(estimation)}|$, which is reflected in the preferred model by $$\left| \frac{\alpha_R v_R - \alpha_L v_L}{d} - D \cdot (\omega_{gyro}^{(measured)} + b) \right|.$$

The minimisation of this expression will give the parameters without ambiguity for a generic trajectory. It will be understood however that alternatively those skilled in the art could use any other functional sensitive to differences between $\omega_{odo}^{(estimation)}$ and $\omega_{gyro}^{(estimation)}$ (norm $L^2$, $L^\infty$, etc.)

To implement this minimisation, the data processing means 21 may work over time over an interval of a given length. In this respect, in a known manner a recursive filter (RLS, recursive least squares method, etc.) or an optimisation (least squares method, etc.) may be used.

Error Characterisation

Preferably, the method further comprises a step (c) of estimating a parameter representative of an error on the calibration parameters (of the gyrometer 11). Step (c) is preferentially implemented after each occurrence of step (b).

The idea is to estimate the quality of information provided by the measurement means 20 to differentiate cases not very favourable to the calibration, i.e. in which the data originating from the means 20 are not reliable, such as cases of skidding, a too strong movement of the chassis due to a too high acceleration (e.g. strong braking or bend), or an important geometric defect (e.g. deflation of a tyre). In this respect, a comparison of said parameter with a threshold may be implemented.

Thus, if said parameter representative of an error is above said predetermined threshold, step (b) has not taken place under favourable conditions and the result of the calibration is not accepted. The parameters of the former calibration are then kept as calibration. It is furthermore possible to temporarily reject the measurements of the means 20 (i.e. the odometric measurements). In other words, if said parameter representative of an error is below said predetermined threshold, step (c) comprises the actual calibration of the gyrometer 11 and/or the means for measuring 20 said at least one quantity representative of the angular velocity of the vehicle 1 with the values determined at step (b) of the calibration parameters.

It should be noted that the determined values of the calibration parameters during an occurrence of step (b), but not used for the actual calibration, may be stored on data storage means 12, and used, during a future occurrence of step (c). For example, it is possible to provide that as long as the parameter representative of an error is above the threshold, the determined calibration parameters are stored, and when the error goes below the threshold, the actual calibration also take account of the stored values.

It is understood that error characterisation makes it possible in a certain manner to identify a running state of the vehicle 1. Running state is taken to mean a characterisation of the movements of the vehicle 1. For example, it is known from experience that time intervals with very strong dynamic are typical of very tight bends or humpbacks, and in a general manner situations of skidding or of movements of the body of the vehicle 1 with respect to the chassis in which the odometric measurements are liable not to be suitable. Conversely, less strong but varied dynamics (linear accelerations and bends which on the one hand are sufficiently slight such that the impact of the movement of the chassis remains negligible or modellable with a sufficient precision but which on the other hand are sufficiently pronounced to facilitate the calibration of scale factors and not only the bias of the gyrometer 11) are typical of situations which provide "rich" data.

A vehicle may in practice be subjected to three different running states:

Straight line without strong acceleration: the running state exploited in US20090265054, which remains favourable to the calibration according to the present method even if it is not the "richest";

Tight bends (or linear accelerations): the course contains tight bends of which the impact on the vehicle does not make it possible to obtain good calibration, and such a running state generally leads to rejected calibrations;

Slight bends: the course contains bends which make it possible to calibrate the scale factor of the gyrometer (if it is so wished) but which are not yet too tight such that the phenomena described above are still negligible or at least modellable (see hereafter). It is this running state, which is in practice the most common and the "richest", that the present method makes it possible to exploit, and that step (c) selects quite particularly.

Generally speaking, said parameter representative of an error on the calibration parameters is a function of at least said second estimated angular velocity, calculated for the determined values of the calibration parameters, and a "reference" angular velocity illustrating a comparison element, which according to a first embodiment is the value of the first angular velocity (the gyrometric angular velocity).

This first embodiment of step (c) is called intrinsic since it only uses quantities available in step (b). Preferably, the estimation residues of step (b) are used, i.e. in the odometric case said parameter representative of an error is in particular the norm (e.g. $L^2$ or $L^\infty$) of $\omega_{odo}^{(estimation)} - \omega_{gyro}^{(estimation)}$ over a given time interval. In such a case, step (c) may be implemented in a concomitant manner with step (b). In the case of a recursive filter, it is possible to use the norm (e.g. $L^2$ or $L^\infty$) of the innovation of the filter over a given time period.

In a second embodiment of step (c), called extrinsic, quantities of yet another type are used, in particular:
the steering wheel angle, if odometry has been used odometry, if the steering wheel angle has been used, GNSS data, e.g. GPS, (if/when available), etc.

Those skilled in the art will know how to calculate on the basis of one or the other of these quantities a reference angular velocity, so as to compare it with the second estimated angular velocity.

It should be noted that said theoretical angular velocity may be obtained using odometric information of optional wheels not used at step (b), i.e. step (a) comprises, for at least one additional wheel provided with an odometer, the acquisition by this odometer of a measured velocity of the additional wheel, so as to obtain a third estimated angular velocity $\omega_{odo'}^{(estimation)}$ in a similar manner to the second (wheels are just changed, to note that a wheel used for the first angular velocity may be reused for the third angular velocity), and said parameter representative of an error on the calibration parameters is then in particular the average of $|\omega_{odo}^{(estimation)} - \omega_{odo'}^{(estimation)}|^2$ over the given time interval.

Alternatively or as a complement, it is possible to resort to learning to improve the estimation of this error parameter and/or to develop an approach for identifying the favourable running state in a more robust manner and with increased availability.

In particular, it is possible to implement learning mechanisms such as neural networks, support vector machines, nearest neighbour methods, decision tree forests, etc. Thus, at each occurrence of steps (b) and (c), it is possible to enrich a learning base wherein each measurement data set (describing the running state of the vehicle 1) is "tagged" with the corresponding value of the parameter representative of an error, so as to progressively (as successive occurrences of steps (b) and (c)) and automatically learn to distinguish acceptable calibrations from non-acceptable calibrations. Thus, the calibration permanently improves itself.

It should be noted that in the case where further quantities of another type are available such as mentioned previously, in a case where said parameter representative of an error is greater than the threshold (i.e. result of the calibration not accepted), it is possible instead to simply reject the values measured by the means 20, to try to model and correct the disruption at the origin of the abnormally high value of the parameter representative of an error. For example:
- skids may be identified using these supplementary data (in particular originating from other odometers);
- body movements may be estimated and thus compensated ("conventional" rolling pitching estimator, see the thesis of P J Bristeau, *Techniques d'estimation du déplacement d'un véhicule sans GPS et autres exemples de conception de systèmes de navigation MEMS* (2012).).
- The deformations of the tyres may be modelled (see documents US 2012/0022780 or U.S. Pat. No. 4,788,645) to be integrated in the calculation.

Estimation of the Movement

As explained, the method advantageously comprises a step (d) of estimating by data processing means 21 the movement of said vehicle 1 as a function of the measured angular velocity of the vehicle 1 and/or the measured values of said at least one quantity representative of the angular velocity of the vehicle 1 (the measured velocities of said wheels 10a, 10b), and values of calibration parameters, updated or not according to the result of step (c), i.e. after actual recalibration if appropriate. Step (d) may be implemented in a continuous manner.

Estimation of the movement is taken to mean in particular at least the estimation of an orientation of the vehicle 1 (in the horizontal plane, i.e. a bearing, it should be noted that it may be assumed that the horizontal plane of the vehicle coincides substantially with the terrestrial horizontal plane, or at least that those skilled in the art will know how to detect and correct a potential difference between these two planes) and advantageously the estimation of a velocity norm. Orientation is typically obtained by integration of the angular velocity.

Preferably, the estimation by the data processing means 21 of the bearing of said vehicle 1 is uniquely done as a function of the measured angular velocity of the vehicle 1 and the values of the calibration parameters. To summarise, information of another type (odometric) is used to calibrate the gyrometer 11, and next for the estimation of the bearing only gyrometric information is used (since it is always available including at low velocity and on non-flat ground). If appropriate, the measured velocities of said wheels 10a, 10b (i.e. the odometric data) are only used in step (d) to determine an overall velocity of the vehicle 1, in particular by determining their average.

Step (d) may further comprise the calculation as a function of said parameter representative of an error on the parameters for calibrating a gyrometric error in orientation (bearing). For example, the bearing error accumulated over a period after a calibration may be estimated by the uncertainty in the estimation of the bias multiplied by the duration of this period.

It should be noted that in a case of an autonomous vehicle, step (d) may comprise the generation of a command of said vehicle 1 as a function of the estimated movement, so as to bring the vehicle 1 for example to a desired destination, or to stop the vehicle 1 while staying in a trajectory free of obstacles.

Equipment and Vehicle

According to a second aspect, the invention relates to in particular an assembly of items of equipment 11, 20a, 20b, 21 for the implementation of one or the other of the embodiments of the method.

This assembly may be installed as a kit in a "conventional" vehicle 1 so as to transform it. Alternatively, the vehicle 1 may be an autonomous vehicle already provided with data processing means 21 for the navigation of the vehicle 1, as well as sensors such as the gyrometer 11 and/or the measurement means 20 such as the odometers 20a, 20b.

In particular a wheeled vehicle 1 is proposed, comprising:
- a gyrometer 11 configured to acquire a measured angular velocity of the vehicle 1;
- means for measuring 20 at least one quantity representative of the angular velocity of the vehicle 1, measured values of said at least one quantity representative of the angular velocity of the vehicle 1, i.e. an angular steering wheel sensor or odometers 20a, 20b equipping at least two of the wheels and configured to acquire measured velocities of said two wheels 10a, 10b,
- data processing means 21 configured to determine values of at least one parameter for calibrating the gyrometer 11 minimising a difference between a first estimated angular velocity of the vehicle 1 and a second estimated angular velocity of the vehicle 1,
  - the first estimated angular velocity of the vehicle 1 being a function of the measured angular velocity and parameters for calibrating the gyrometer 11, and
  - the second estimated angular velocity of the vehicle 1 being a function of the measured values of said at least one quantity representative of the angular velocity of the vehicle 1 (preferentially as a function of the measured velocities of the wheels 10a, 10b and parameters for calibrating the odometers 20a, 20b).

As explained previously, the vehicle 1 may further comprise a memory 22 and an interface 23, as well as other sensors such as an angular steering wheel sensor or a GNSS receiver.

Furthermore, the data processing means 21 may be further configured to estimate a parameter representative of an error on the calibration parameters, and/or estimate a movement of said vehicle 1 as a function of the measured angular velocity of the vehicle 1 and/or the measured velocities of said wheels 10a, 10b (if appropriate according to the result of a comparison of said parameter representative of an error with a threshold), and the values of the calibration parameters.

Computer Programme Product

According to a third and a fourth aspect, the invention relates to a computer programme product comprising code instructions for the execution (on the processing means 21) of a method for calibrating a gyrometer 11 according to the first aspect of the invention, as well as storage means readable by a computer equipment (for example data storage means 22) on which this computer programme product is found.

The invention claimed is:

1. A method for calibrating a gyrometer equipping a vehicle, the method comprising:
   (a) Acquisition
       by the gyrometer, of a measured angular velocity of the vehicle, and
       by measuring means, of measured values of at least one quantity representative of the angular velocity of the vehicle;
   Calculation of:
       a first estimated angular velocity of the vehicle that is a function of the measured angular velocity and of gyrometer calibration parameters, and
       a second estimated angular velocity of the vehicle that is a function of the measured values of said at least one quantity representative of the angular velocity of the vehicle;
   (b) Determination of at least one updated value for at least one of the gyrometer calibration parameters that minimises a difference between the first estimated angular velocity of the vehicle and the second estimated angular velocity of the vehicle, and
   (c) Estimation of an error parameter representative of an error on the at least one updated value for at least one of the gyrometer calibration parameters and, if and only if said error parameter is below a predetermined threshold, actual calibration of the gyrometer with the at least one updated value for at least one of the gyrometer calibration parameters.

2. The method of claim 1, wherein the first estimated angular velocity $\omega_{gyro}^{(estimation)}$ of the vehicle is linked to the measured angular velocity $\omega_{gyro}^{(measured)}$ by a model $\omega_{gyro}^{(estimation)} = D \cdot (\omega_{gyro}^{(measured)} + b)$, where D and b are the gyrometer calibration parameters.

3. The method of claim 1, wherein step (b) comprises implementing a recursive filter or an optimisation.

4. The method of claim 1, wherein the measuring means includes at least one of at least two odometers, or a steering wheel angle sensor.

5. The method of claim 4, wherein the measuring means consist in at least two odometers for measuring measured velocities of at least two wheels of the vehicle, said at least one quantity representative of the angular velocity of the vehicle comprising said measured velocities of said wheels, and said second estimated angular velocity of the vehicle being a function of the measured velocities of the wheels and of odometers calibration parameters.

6. The method of claim 5, wherein step (b) also comprises the determination of at least one updated value for at least one of the odometers calibration parameters that minimises a difference between the first estimated angular velocity of the vehicle and the second estimated angular velocity of the vehicle.

7. The method of claim 6, wherein step (c) comprises, if and only if said error parameter is below a predetermined threshold, an actual calibration of the measuring means with the at least one updated value for at least one of the odometers calibration parameters.

8. The method of claim 5, wherein said measured velocities comprise a first measured velocity $v_L$ of a left rear wheel of the vehicle and a second measured velocity $v_R$ of a right rear wheel of the vehicle, the second estimated angular velocity $\omega_{odo}^{(estimation)}$ of the vehicle being linked to said first and second measured velocities $v_L$, $v_R$ by the formula $$\omega_{odo}^{(estimation)} = \frac{\alpha_R v_R - \alpha_L v_L}{d},$$

where $\alpha_R$, $\alpha_L$ and d are the odometers calibration parameters.

9. The method of claim 8, wherein the first estimated angular of $\omega_{gyro}^{(estimation)}$ of the vehicle is linked to the measured angular velocity $\omega_{gyro}^{(measured)}$ by a model $\omega_{gyro}^{(estimation)} = D \cdot (\omega_{gyro}^{(measured)} + b)$, where D and b are the gyrometer calibration parameters, wherein the calibration parameters D and d are predetermined, step (b) comprising the determination of updated values for calibration parameters b, $\alpha_R$ and $\alpha_L$.

10. The method of claim 5, wherein step (b) comprises the minimisation of $|\omega_{odo}^{(estimation)} - \omega_{gyro}^{(estimation)}|$, where $\omega_{gyro}^{(estimation)}$ is the first estimated angular velocity of the vehicle and $\omega_{odo}^{(estimation)}$ is the second estimated angular velocity of the vehicle.

11. The method of claim 1, wherein said error parameter is a function of said first and second estimated angular velocities calculated with the at least one updated value determined in step (b).

12. The method of claim 11, wherein said error parameter is the average of $|\omega_{odo}^{(estimation)} - \omega_{gyro}^{(estimation)}|$ over a given time interval, where $\omega_{gyro}^{(estimation)}$ is the first estimated angular velocity of the vehicle and $\omega_{odo}^{(estimation)}$ is the second estimated angular velocity of the vehicle.

13. The method of claim 1, comprising a step (d) of estimation by the data processing means of a movement of said vehicle as a function of the measured angular velocity of the vehicle and of the gyrometer calibration parameters.

14. The method of claim 13, wherein an orientation of the vehicle is estimated at step (d) uniquely as a function of the measured angular velocity of the vehicle and of the gyrometer calibration parameters.

15. The method of claim 13, wherein the measuring means consist in at least two odometers for measuring measured velocities of at least two wheels of the vehicle, said at least one quantity representative of the angular velocity of the vehicle comprising said measured velocities of said wheels, and an overall velocity of the vehicle is estimated at step (d) as a function of said measured velocities of said wheels.

16. A non-transitory computer-readable medium comprising a computer programme product comprising code instructions for the execution of the method of claim 1.

17. A wheeled vehicle, comprising a gyrometer configured to acquire a measured angular velocity of the vehicle, measuring means configured to acquire measured values of at least one quantity representative of the angular velocity of the vehicle, and data processing means configured to:
   calculate a first estimated angular velocity of the vehicle that is a function of the measured angular velocity and of gyrometer calibration parameters and a second estimated angular velocity of the vehicle that is a function of the measured values of said at least one quantity representative of the angular velocity of the vehicle,
   determine at least one updated value for at least one of the gyrometer calibration parameters that minimises a difference between the first estimated angular velocity of the vehicle and the second estimated angular velocity of the vehicle, estimate an error parameter representative of an error on the at least one updated value for at least one of the gyrometer calibration parameters, and if and only if said error parameter is below a predetermined threshold, perform an actual calibration of the gyrometer with the at least one updated value for at least one of the gyrometer calibration parameters.

\* \* \* \* \*